June 5, 1962    R. A. NITSCH    3,037,587
SLACK ADJUSTER FOR POWER TRANSMISSION SYSTEMS
Filed Sept. 2, 1960    2 Sheets-Sheet 1
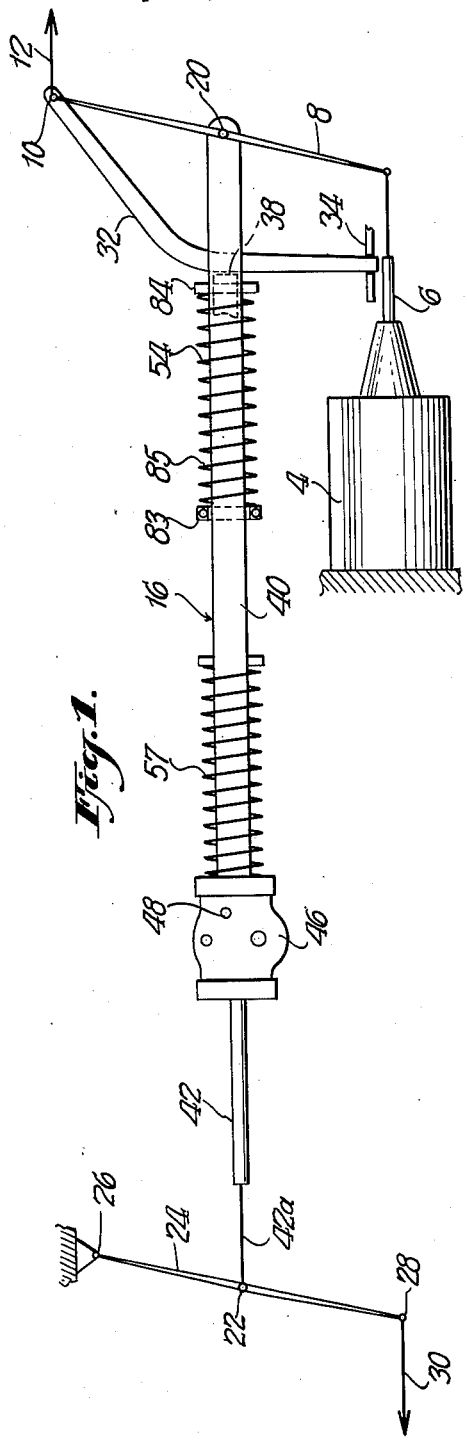
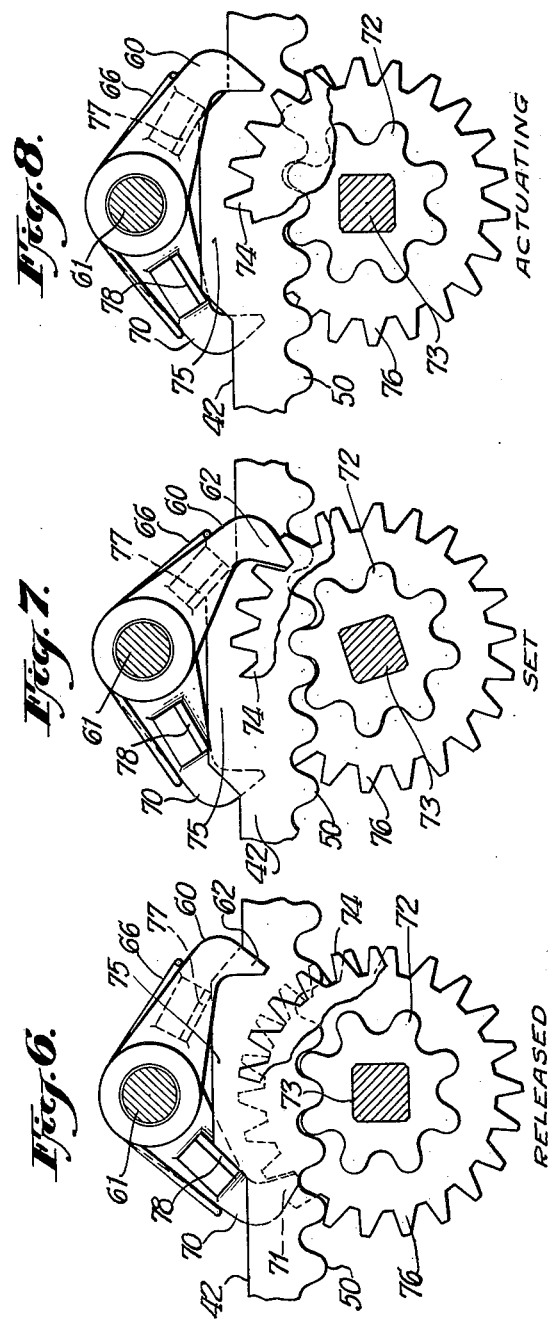
INVENTOR.
ROBERT A. NITSCH
BY
ATTORNEYS.

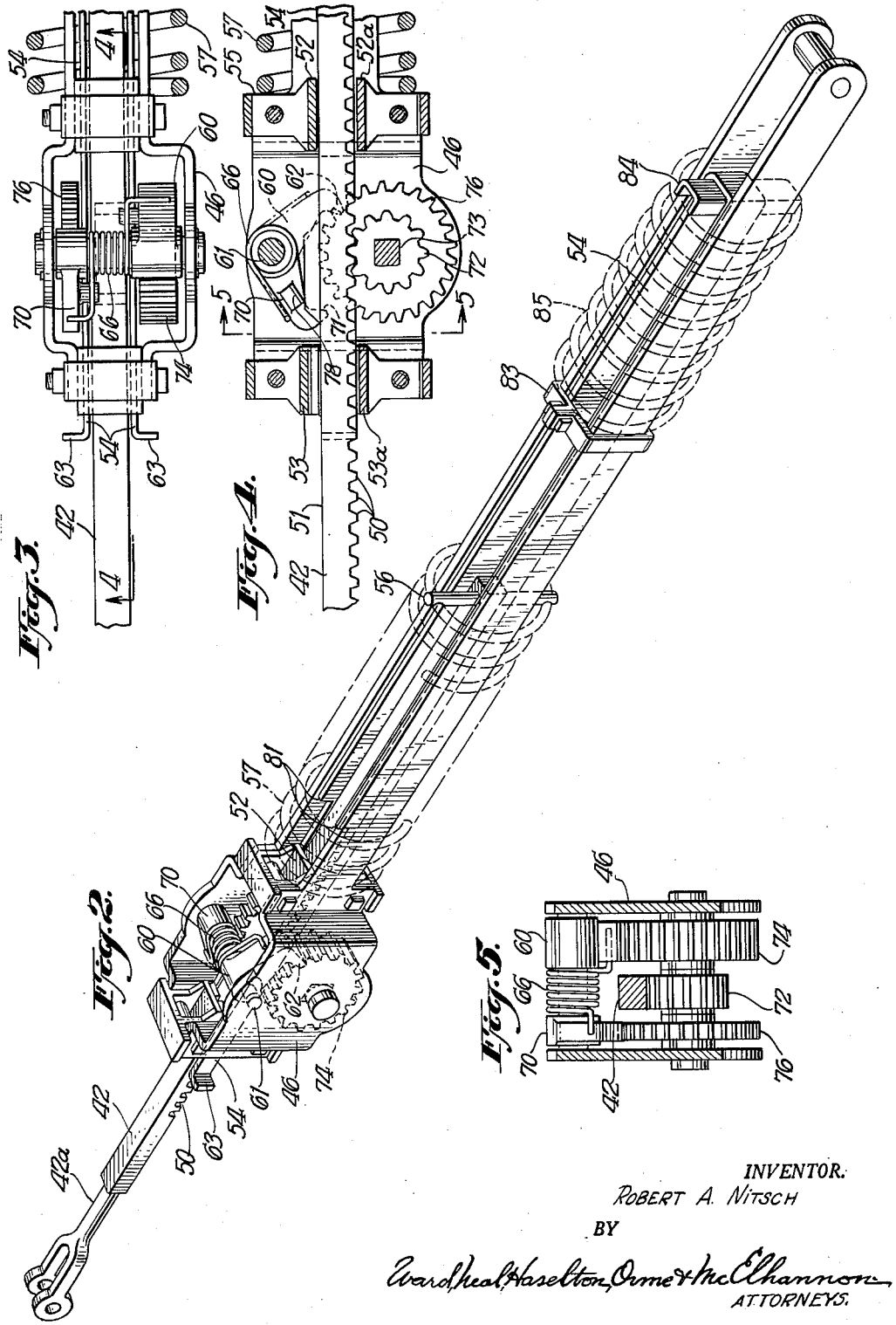

United States Patent Office 3,037,587
Patented June 5, 1962

3,037,587
SLACK ADJUSTER FOR POWER TRANSMISSION SYSTEMS
Robert A. Nitsch, Westbury, N.Y., assignor, by mesne assignments, to Robert M. Holloway and Robert L. Ludington, jointly, both of Michigan City, Ind.
Filed Sept. 2, 1960, Ser. No. 57,861
6 Claims. (Cl. 188—196)

The invention relates to power transmission systems particularly to an arrangement useful in controlling power source movement by a slack elimination in such systems, and has particular utility as applied to brake riggings for railway rolling stock or the like.

It is well known to those skilled in the art that for optimum braking pressure in braking apparatus comprising a fluid operated cylinder and piston arrangement, the movement of the piston rod should be within relatively close predetermined limits. However, various reasons, such as wear in brake rigging, wear in the braking shoes or on the surfaces of the braking wheels, replacement of brake shoes, etc., the extent of movement of the portion of the brake rigging operated by the piston rod may vary and if compensating devices are not included in the brake rigging the braking pressure may vary in use. To restrict the movement of the braking piston rod within desired limits, it has heretofore been proposed to employ devices between component parts of the rigging for automatically compensating for the various factors which vary the movement of the brake rigging, such devices being known as brake slack adjusters.

The force involved in braking may exceed 25,000 pounds and the space available for the installation of a brake slack adjusting device is relatively small. Accordingly, it is difficult to meet the space requirements and still provide a structure which has sufficient strength to withstand the braking forces.

A brake slack adjusting device including a toothed member or rack as disclosed in the copending application of Everard C. Mersereau, Serial No. 846,431 filed October 14, 1959 and entitled "Slack Adjuster for Power Transmission Systems," now Patent No. 3,001,612, issued September 26, 1961. It is pointed out in said application that the braking force applied to the brake slack adjuster may subject elements of device, such as the toothed member or rack, to lateral or sidewise forces of relatively large magnitude, for example, in excess of 30,000 pounds. Thus in the slack brake adjuster described in said application the toothed member or rack may, at the point at which it engages the detent, be subjected to lateral forces of large magnitude and therefore in order adequately to support such toothed member or rack and to increase the ease with which it may be moved, it is desirable to support such member or rack on the side thereof opposite from the detent by relatively smooth and strong supports or bearings. With such an arrangement, it is difficult to provide adjusting teeth on both sides of the member and rack without lengthening the device and in addition a member or rack having teeth on both sides thereof is difficult and more costly to manufacture. Accordingly, in the brake slack adjusting device of said application, teeth are provided on only a single side of the toothed member or rack.

In the brake slack adjusting device of the aforesaid copending application, the position of the toothed member or rack is controlled by a pair of detents or pawls, one such pawl being a locking pawl and the other such pawl being a load pawl. The load pawl engages the teeth of the adjusting member and transfers the whole braking force from the housing of the device to the adjusting member. Accordingly, the teeth must be relatively large to withstand the braking forces and hence the minimum amount of separation between the teeth cannot be less than a predetermined amount. On the other hand, the locking pawl, which engages the same teeth, transmits only relatively small forces between the housing and the adjusting member so that the size of the teeth and the separation therebetween is larger than is required for adjustment purposes. In addition, because the spacing of the teeth is determined by the braking forces difficulty is sometimes encountered in obtaining the fineness of adjustment desired to satisfy the limits placed on the movement of the braking piston rod.

The slack adjusting device of the present invention includes many of the features of the slack adjusting device described in said copending application and in addition includes means for permitting greater fineness of adjustment of the slack adjusting device. In the preferred embodiment of the invention, the movable mechanism of the slack adjusting device is contained in a housing and includes a rack member with teeth on a single side thereof which teeth may be relatively large and hence of a size sufficient to provide the desired strength. Such teeth engage and drive a gear which in turn drives a pair of ratchet wheels, one of which is engageable by a locking pawl and the other of which is engageable by a load pawl. The teeth on the ratchet wheel engageable with the load pawl be made relatively large so as to withstand the braking forces whereas the teeth on the ratchet wheel engageable with the locking pawl may be relatively small and closely spaced so as to permit smaller increments of adjustment than is possible when both the load and locking pawls engage the same set of teeth.

It is one object of the invention to provide a slack adjusting device which is simple and relatively inexpensive to manufacture and which is reliable and safe to operate.

It is a further object of the invention to provide a slack adjusting device which is relatively small in size and yet strong enough to withstand high braking forces and which will permit the adjustment of slack in increments which are substantially independent in size of the requirements imposed by braking forces.

Other objects and advantages of the invention will be apparent to those skilled in the art from the following detailed description of the preferred embodiment thereof, which description should be considered in conjunction with the accompanying drawings in which:

FIG. 1 is a schematic, plan view illustrating the slack adjusting device of the invention in association with a typical brake rigging arrangement;

FIG. 2 is an enlarged perspective view of the slack adjusting device of the invention;

FIG. 3 is an enlarged plan view of a portion of the embodiment shown in FIG. 2;

FIG. 4 is a fragmentary, side elevation, sectional view, taken along the line 4—4 in FIG. 3, of the embodiment of the invention;

FIG. 5 is a sectional end elevation view, taken along the line 5—5 in FIG. 4, of the embodiment of the invention; and FIGS. 6, 7 and 8 are enlarged, fragmentary, side elevation views, partly in cross-section, of part of the slack adjusting mechanisms of the embodiment of the invention and illustrates the parts thereof in different relative positions.

The preferred slack adjusting device is illustrated in FIG. 1 in connection with a schematic showing typical brake rigging currently employed in railway rolling stock. An air cylinder 4 having a connection (not shown) to a reservoir of fluid under pressure, such as air, is mounted in a fixed position on the car. A piston rod 6 is operatively associated with a piston (not shown) mounted internally of the cylinder 4 and at its extremity, the rod 6 is pivotally connected to one end of the live lever 8 which extends transversely of the car and center sill thereof.

The opposite end of the live lever 8 is pivotally connected as at 10 to one end of the pull-rod 12, said pull-rod 12 being connected to a well known type of linkage, which operates brake shoes mounted in braking relation to the periphery of the wheels on one truck of the car. The preferred slack adjusting device 16 is pivotally connected at one end, as at 20, to live lever 8, said device 16 having its opposite end pivotally connected, as at 22, to fulcrum lever 24, said lever 24 being pivoted at one end thereof, as at 26, in a fixed or determined relation to the car. The opposite end of the lever 24 is pivotally connected, as at 28, to another pull-rod 30, which in turn is connected to a conventional linkage arrangement which operates brake shoes, arranged in braking relation to the wheels of a second truck of the car.

An activator lever 32 is pivotally connected at 10 to one end of the live lever 8. The opposite end of the activator lever 32 extends through an opening in a slotted plate 34, which opening loosely receives the end of the activator lever 32 so that it is free to move a small amount in the longitudinal direction of the railway car and so that it is free to move transversely of said car. The slotted plate 34 is mounted on the railway car in a conventional manner, such as is shown in said copending application. The positions of the live lever 8, the activator lever 32, the piston rod 6, the slack adjusting device 16 and the fulcrum lever 24 when the brakes are fully applied are shown in FIG. 1.

The end 38 of the activator 54 is engaged by the activator lever 32 when the brakes are applied, and causes operation of the slack adjusting device 16 in a manner hereinafter described. On the other hand, when the brakes are released, the end 38 and the activator lever 32 separate.

When the brakes are applied, movement of the activator 54, as a result of its engagement with the activator lever 32 and movement thereof, operates the mechanism of the slack adjusting device 16 in such a manner as to reduce the over-all length of the adjusting device 16 when there is slack in the brake rigging. Thus, when there is slack in the brake rigging the distance between the pivot point 22 and the pivot point 20, FIG. 1, decreases during the application of the brakes.

Preferably, the parts of the slack adjusting device 16 are made of steel, but it is to be understood that they may also be made of other materials capable of withstanding the forces applied thereto. The slack adjusting device 16 comprises a housing 40 from one end of which extends the rack bar 42. An extension 42a of the rack bar 42 is pivotally connected to the lever 24 at 22.

The opposite end of the housing 40 is pivotally secured at 20 to the live lever 8. The housing 40 has a projecting portion 46 at one end, which projecting portion 46 houses the load pawl, locking pawl, gear wheel, load ratchet, locking ratchet and gear wheel shaft, etc. hereinafter described. Prior to installation, the load pawl may be locked in a holding position by means of a pin 48 inserted through the projecting portion 46.

The slack adjusting device 16 is illustrated in greater detail in FIGS. 2–5. The rack bar 42 has rack teeth 50 at one side thereof, such rack teeth 50 facing toward the rack driven gear 72 and at its opposite side 51 the rack 42 is relatively flat and smooth. The rack bar 42 is slidably mounted in the housing 40 and is slidable longitudinally in the housing 40. The side 51 of the rack bar 42 bears against two bearings or bearing blocks 52 and 53 supported on and secured to housing projection 46. The bearings 52a and 53a also act as a guide for actuator 54 which straddles rack bar 42.

The flat side 55 of the projecting housing 46 is a bearing point and stop for coil spring 57. The rack bar 42 is provided with a pin or projection 56 which moves with the rack bar 42. The coil spring 57 is mounted intermediate the pin 56 and the stop 55 and moves the rack bar 42 to the right with respect to the housing 40 as viewed in FIG. 2.

The load pawl 60 is pivotally mounted as at 61 in the housing 40 within the projecting portion 46. The load pawl 60 has a portion in the form of a tooth 62 which is engageable with the teeth of the load ratchet wheel 74, which through the use of a square shaft 73, is driven by or drives gear 72, which is engaged at all times with the rack teeth 50 of the rack bar 42. The load pawl 60 is urged toward the ratchet wheel teeth by a spring 66. The locking pawl 70 is pivotally mounted as at 61 in the housing 40 within the projecting portion 46. The locking pawl 70 has a portion in the form of a tooth 71, which is engageable with the teeth of the locking ratchet wheel 76, which through the use of the square shaft 73 turns with the gear 72.

It will be noted that when the locking pawl tooth 71, FIG. 5, is in engagement with the teeth of the locking ratchet wheel 76, the rack bar 42 is prevented from moving to the right as viewed in FIGS. 1–4. Furthermore, when the load pawl 60 is in engagement with the teeth of the ratchet wheel 74 movement of the rack bar to the left is prevented.

As shown in FIGS. 6–8, the load pawl 60 is provided with a projecting portion 77 which is engageable with the raised portion 75 of the actuator 54. Similarly, the locking pawl 70 has a projecting portion 78 which is engageable with the raised portion 75 of the actuator 54. FIGS. 6, 7 and 8 show the position of the raised portion 75 of the actuator 54, and hence the position of the actuator 54, in the brakes released position, the brakes set position and in an intermediate position, respectively. In the position shown in FIG. 6, the raised portion 75 permits the projecting portion 78 and hence the locking pawl 70 to move downwardly into engagement with the locking ratchet wheel 76 and forces the projecting portion 77 and hence the pawl 60 upwardly away from the load ratchet wheel 74. When the actuator is moved to the left, the raised portion 75 moves both the load pawl 60 and the locking pawl 70 to intermediate positions in which both pawls are out of engagement with their associated ratchet wheels as shown in FIG. 8 by virtue of the engagement of the raised portion 75 with the projection portions 77 and 78. Similarly, as the actuator 54 is moved further to the left as illustrated in FIG. 7 the load pawl 60 moves downwardly into engagement with the ratchet wheel 74 and the locking pawl 70 moves upwardly into the position shown in FIG. 7.

The actuator 54 is slidable from right to left in the position as shown in FIG. 2. The actuator 54 also rides or slides on the bearings 52, 52a, 53 and 53a, bearing 52 also acting as a stop for the projecting portions 81 of the actuator 54. A coil spring 85 is mounted between stop 83 which is fastened to the housing 40 and stop 84 with is fastened to the actuator 54. The end 38 which contacts the activator lever 32 (FIG. 1) is shown located within the housing 40, but if desired, this contacting portion of the actuator 54 may be located in other positions to accommodate different installation requirements. The projecting portion 63 (FIGS. 2 and 3) of the actuator 54 acts as a stop to limit the movement of the actuator 54 to the right as viewed in FIGS. 2 and 3.

When the brakes are applied, the piston rod 6 moves to the right as viewed in FIG. 1, and for the reasons set forth in said copending application, the activator lever 32 will engage the end 38 of the actuator 54 during some portion of the movement of the piston rod 6 dependent upon the amount of movement of the brake rigging and hence the activator lever 32 and the housing 40. As the piston rod 6 continues to move and after the activator lever 32 has engaged the end 38, the actuator 54 will move to the left with respect to the housing 40 so that both the load pawl 60 and the locking pawl 70 will be out of engagement with their respective ratchet wheels as illustrated in FIG. 8. If the slack is correct, there will be substantially no movement of the rack bar 42 with respect to the housing 40 for adjustment purposes at this time, and as the piston rod 6 continues to move, the actuator 54 continues to move to the left with respect to the housing 40 and permits the load pawl 60 to engage the load ratchet wheel 74 thereby transmitting further braking force through the housing 40, the load pawl 60, the load ratchet wheel 74, the shaft 73, the gear 72 and the rack bar 42.

Upon release of the brakes the sequence of operations just described above is reversed and the parts resume the positions illustrated in FIG. 6 when the brakes are fully released.

When the slack adjusting device 16 is initially installed, the spring 57 is partially compressed and the locking pawl 70 is in engagement with the teeth of the ratchet wheel 76 so as to maintain the spring 57 in its partially compressed state. The spring 57 applies sufficient force to the pin 56 on the rack bar 42 to take up any slack in the brake rigging when the locking pawl 70 is disengaged from the tooth of the ratchet wheel 76. However, the spring 57 is not strong enough to cause the brake shoes to exert any appreciable pressure on the wheels of the car when the locking pawl 70 is disengaged from its associated teeth. The spring 85 is normally relatively smaller than the spring 57 and is merely strong enough to return the actuator 54 to its extreme right position as viewed in FIGS. 1 and 2.

If there is too much slack in the rigging so that the travel of the piston rod 6 would tend to be greater than the desired amount, the end 38 is engaged by the activator lever prior to the time at which the piston rod 6 reaches the desired braking position. The spring 57 will move the rack bar 42 with respect to the housing 40 and to the right as viewed in FIGS. 1 and 2 when the locking pawl 70 becomes disengaged from the teeth of its associated ratchet wheel 76 because of engagement of the end 38 with the activator lever 32 and consequent movement of the actuator 54 described above. Because of the engagement of the gear 72 with the teeth 50 of the rack bar 42 and the driving connection between the gear 72 and the ratchet wheels 74 and 76, the ratchet wheels 74 and 76 will rotate as the rack bar 42 moves. As the rack bar 42 moves, the length of the slack adjusting device 16 between the points 20 and 22 (FIG. 1) will be shortened until the brake shoes engage the car wheels and before the application of the braking force through the load pawl 60 and the associated parts. Accordingly, the travel of the piston rod 6 is less than it would be without the presence of the slack adjusting device 16 and may be maintained within the desired limits.

When the brakes are thereafter released, the rack bar 42 does not return to its previous position with respect to the housing 40 because of the continued pressure of the spring 57 which continues to prevent return of the brake rigging to its slack position. Accordingly, the locking pawl 70 engages a new tooth on the ratchet wheel 76 provided that there has been sufficient movement of the rack bar 42 in relation to the spacing between the teeth on the ratchet wheel 76.

Similarly, it will be apparent that if the brake rigging is too tight, and hence the travel of the piston rod 6 would tend to be less than that desired, the brake shoes engage the car wheels before the end 38 engages the lever 32 and the pull-rods 12 and 30 cease to move. As the rod 6 continues its movement, the locking pawl 70, due to the shape of the tooth 71 thereof, will ride over the teeth of the ratchet wheel 76 as the braking forces are applied, and the rack bar 42 moves to the left under the braking forces, the spring 57 being compressed. As the rod 6 approaches the desired braking position, the end 38 engages the lever 32 and further movement causes the pawl 60 to engage its ratchet wheel 74 and to apply the brakes. Again, when the brakes are thereafter released, the locking pawl 70 will engage a new tooth on the ratchet wheel 76 provided that there is sufficient movement of the rack bar 42 in relation to the spacing of the teeth on the ratchet wheel 76.

It will be apparent from the foregoing that because the teeth of the ratchet wheel 74 must transmit the braking forces, such teeth must be relatively strong and hence relatively large and widely spaced. On the other hand, since the teeth of the locking ratchet wheel 76 must withstand only the force of the spring 85, the teeth of the locking ratchet wheel 76 may be relatively small and closely spaced. The minimum amount of slack variation for which the adjusting device 16 can compensate is dependent upon the spacing of the teeth on the ratchet wheel 76 and also on the diameter thereof. Thus, for a given increment of adjustment, the locking ratchet wheel may be of relatively large diameter with its teeth relatively widely spaced or of a relatively small diameter with its teeth closely spaced. However, in order to obtain the advantages of the invention in an embodiment of the type described in which both ratchet wheels rotate at the same rate, the number of teeth on the locking ratchet wheel should be greater than the number of teeth on the load ratchet wheel. By the use of the apparatus of the invention, compensation may be made for relatively small changes in the slack of the brake rigging, and the travel of the piston rod 6 for braking purposes may be controlled within relatively close limits even though a rack bar with teeth on only one side is employed.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A slack adjusting device comprising a support member; a rack bar having rack teeth thereon at one side thereof, said rack bar being movably mounted on said support member; spring means acting between said member and said bar for urging said bar in a predetermined direction; a pair of ratchet wheels, each having ratchet teeth, mounted on said member; driving means interconnecting said wheels and said rack teeth in driving relation; a pair of pawls mounted on said member, one pawl adjacent the teeth of one of said ratchet wheels and the other adjacent the teeth of the other of said ratchet wheels; said pawls being engageable with the respectively adjacent ratchet wheel teeth for respectively preventing movement of said bar in said direction and in an opposite direction; means engaging said pawls for moving said pawls into engagement with said teeth; an actuator movably mounted on said member and engageable with said pawls, said actuator, in a first position thereof, holding one said pawl out of engagement with its adjacent teeth and permitting the other said pawl to engage its adjacent teeth, and said actuator, in a second position thereof, holding said other pawl out of engagement with its adjacent teeth and permitting said one pawl to engage its adjacent teeth, and means acting between said member and said actuator for urging said actuator in a predetermined direction.

2. A slack adjusting device comprising a housing; a rack bar having rack teeth thereon at one side thereof, said rack bar being movably mounted on said housing; spring means acting between said housing and said bar for urging said teeth away from said housing; a load ratchet wheel and a locking ratchet wheel, each having ratchet teeth, mounted on said housing; a gear mounted on said housing and in engagement with said rack teeth and connected in driving relation with said wheels; a load pawl mounted in said housing adjacent the teeth of said load ratchet wheel and engageable with said last-mentioned teeth for preventing movement of said bar in a first direction; a locking pawl mounted in said housing adjacent the teeth of said locking ratchet wheel and engageable with said last-mentioned teeth for preventing movement of said bar in a second direction; means engaging said pawls for moving each said pawl into engagement with the teeth of the ratchet wheel adjacent thereto; an actuator movably mounted in said housing and engageable with said pawls, said actuator, in a first position thereof, holding said load pawl out of engagement with said teeth of said load ratchet wheel and permitting said locking pawl to engage said teeth of said locking ratchet wheel, and said actuator, in a second position thereof, holding said locking pawl out of engagement with said teeth of said locking ratchet wheel and permitting said load pawl to engage said teeth of said load ratchet wheel; and means acting between said housing and said actuator for urging said actuator away from said housing.

3. A slack adjusting device comprising a housing; a rack bar having rack teeth thereon at one side thereof, said rack bar being movably mounted on said housing; spring means in said housing and acting between said housing and said bar for urging said bar in a first direction; a load ratchet wheel and a locking ratchet wheel, each having ratchet teeth and the locking ratchet wheel having a greater number of teeth than said load ratchet wheel, mounted on said housing on a common shaft; a gear mounted on said shaft and in engagement with said rack teeth, said shaft providing a driving connection between said wheels and said gear; a load pawl mounted in said housing adjacent the teeth of said load ratchet wheel and engageable with said last-mentioned teeth for preventing movement of said load ratchet wheel and movement of said bar in a second direction; a locking pawl mounted in said housing adjacent the teeth of said locking ratchet wheel and engageable with said last-mentioned teeth for preventing movement of said locking ratchet wheel and movement of said bar in said first direction; means engaging said pawls for moving each said pawl into engagement with the teeth of the ratchet wheel adjacent thereto; an actuator movably mounted in said housing and engageable with said pawls, said actuator, in a first position thereof, holding said load pawl out of engagement with said teeth of said load ratchet wheel and permitting said locking pawl to engage said teeth of said locking ratchet wheel, said actuator, in a second position thereof, holding said locking pawl out of engagement with said teeth of said locking ratchet wheel and permitting said load pawl to engage said teeth of said load ratchet wheel, and said actuator, in a third position thereof, holding both said pawls out of engagement with said teeth of said wheels; and means acting between said housing and said actuator for urging said actuator away from said housing.

4. In a slack adjusting device having a housing and a rack bar with rack teeth at one side thereof, said rack bar being movable with respect to said housing, the combination therewith of a pair of ratchet wheels, each having teeth, mounted on said housing, driving means engaging said teeth on said rack bar and connected to said ratchet wheels for causing rotation of said wheels when said rack bar is moved longitudinally and vice versa, a pair of pawls mounted on said housing, one of said pawls being adjacent and engageable with the teeth of one of said ratchet wheels for preventing rotation thereof in a direction corresponding to movement of said rack bar in a first direction and the other of said pawls being adjacent and engageable with the teeth of the other of said ratchet wheels for preventing rotation thereof in a direction corresponding to movement of said rack bar in the opposite direction, and an actuator movably mounted on said housing and engageable with one of said pawls in a first position thereof and engageable with the other of said pawls in a second position thereof for alternately moving each said pawl into engagement with the teeth of the ratchet wheel adjacent thereto.

5. In a slack adjusting device having a housing and a rack bar with rack teeth at one side thereof, said rack bar being movable with respect to said housing, the combination therewith of a pair of ratchet wheels mounted on said housing, each having teeth and one having a greater number of teeth than the other, driving means engaging said teeth on said rack bar and connected to said ratchet wheels for causing rotation of said wheels when said rack bar is moved longitudinally and vice versa, a pair of pawls mounted on said housing, one of said pawls being adjacent and engageable with the teeth of one of said ratchet wheels for preventing rotation thereof in a direction corresponding to movement of said rack bar in a first direction and the other of said pawls being adjacent and engageable with the teeth of the other of said ratchet wheels for preventing rotation thereof in a direction corresponding to movement of said rack bar in the opposite direction, and an actuator movably mounted on said housing and engageable with one of said pawls in a first position thereof and engageable with the other of said pawls in a second position thereof for alternately moving each said pawl into engagement with the teeth of the ratchet wheel adjacent thereto.

6. In a slack adjusting device having a housing, a rack bar with rack teeth at one side thereof, said rack bar being movable with respect to said housing, and spring means urging said bar in a predetermined direction with respect to said housing the combination therewith of a pair of ratchet wheels mounted on said housing, each having teeth and one having a greater number of teeth than the other, driving means engaging said teeth on said rack bar and connected to said ratchet wheels for causing rotation of said wheels when said rack bar is moved longitudinally and vice versa, a pair of oppositely acting pawls mounted on said housing, one of said pawls being adjacent and engageable with the teeth of one of said ratchet wheels for preventing rotation thereof in a direction corresponding to movement of said rack bar in a first direction and the other of said pawls being adjacent and engageable with the teeth of the other of said ratchet wheels for preventing rotation thereof in a direction corresponding to movement of said rack bar in the opposite direction, an actuator movably mounted on said housing and engageable with one of said pawls in a first position thereof and engageable with the other of said pawls in a second position thereof for alternately moving each said pawl into engagement with the teeth of the ratchet wheel adjacent thereto, and spring means acting between said actuator and said housing for urging said actuator in a predetermined direction.

References Cited in the file of this patent
UNITED STATES PATENTS

| | | |
|---|---|---|
| 507,905 | Hinckley | Oct. 31, 1893 |
| 982,616 | Madden et al. | Jan. 24, 1911 |
| 2,169,137 | Bryant | Aug. 8, 1939 |